(12) United States Patent
Ohkame et al.

(10) Patent No.: US 10,625,217 B2
(45) Date of Patent: *Apr. 21, 2020

(54) COMPOSITE SEPARATION MEMBRANE

(71) Applicant: TOYOBO CO., LTD., Osaka-shi, Osaka (JP)

(72) Inventors: Takashi Ohkame, Otsu (JP); Takahito Nakao, Otsu (JP); Seiji Watanuki, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 472 days.

This patent is subject to a terminal disclaimer.

(21) Appl. No.: 14/419,030

(22) PCT Filed: Aug. 20, 2013

(86) PCT No.: PCT/JP2013/072154
§ 371 (c)(1),
(2) Date: Feb. 2, 2015

(87) PCT Pub. No.: WO2014/054346
PCT Pub. Date: Apr. 10, 2014

(65) Prior Publication Data
US 2015/0209736 A1    Jul. 30, 2015

(30) Foreign Application Priority Data

Oct. 4, 2012    (JP) .................................. 2012-221891

(51) Int. Cl.
*B01D 71/68*    (2006.01)
*B01D 69/12*    (2006.01)
(Continued)

(52) U.S. Cl.
CPC ........... *B01D 71/68* (2013.01); *B01D 61/025* (2013.01); *B01D 67/0002* (2013.01);
(Continued)

(58) Field of Classification Search
CPC ................ B01D 71/68; B01D 67/0002; B01D 67/0095; B01D 71/76; B01D 69/08;
(Continued)

(56) References Cited

U.S. PATENT DOCUMENTS 3,648,845 A * 3/1972 Riley ................. B01D 67/0009
210/490
4,073,724 A    2/1978 Chapurlat
(Continued)

FOREIGN PATENT DOCUMENTS

EP    0 219 125 A2    4/1987
EP    0 277 834 A2    8/1988
(Continued)

OTHER PUBLICATIONS

Notification of Transmittal of Translation of the International Preliminary Report on Patentability (Form PCT/IB/338) of International Application No. PCT/JP2013/072154 dated Apr. 9, 2015 with Form PCT/PEA/409 (5 pages).
(Continued)

*Primary Examiner* — Taiwo Oladapo
(74) *Attorney, Agent, or Firm* — Westerman, Hattori, Daniels & Adrian, LLP

(57) ABSTRACT

The present invention provides a composite separation membrane having a separation layer formed of SPAE on the surface of a porous support membrane wherein the porous support membrane and a coat of SPAE are firmly adhered with each other so that separation property and water permeation property continue for a long period. The present invention is a composite separation membrane having a separation layer on the surface of a porous support membrane, characterized in that said porous support membrane contains 50% by mass or more of polyphenylene ether, and that said separation layer is formed of a sulfonated pol-
(Continued)

yarylene ether copolymer constituted from a repeating structure of a specific hydrophobic segment and a specific hydrophilic segment. The composite separation membrane of the present invention is suitable as a liquid treating membrane such as a nanofiltration membrane and a reverse osmosis membrane.

5 Claims, 2 Drawing Sheets

(51) Int. Cl.
  *B01D 67/00*   (2006.01)
  *B01D 69/08*   (2006.01)
  *B01D 69/02*   (2006.01)
  *C02F 1/44*   (2006.01)
  *B01D 71/76*   (2006.01)
  *B01D 61/02*   (2006.01)
  *B01D 71/52*   (2006.01)

(52) U.S. Cl.
  CPC ..... *B01D 67/0093* (2013.01); *B01D 67/0095* (2013.01); *B01D 69/02* (2013.01); *B01D 69/08* (2013.01); *B01D 69/12* (2013.01); *B01D 71/76* (2013.01); *C02F 1/441* (2013.01); *C02F 1/442* (2013.01); *B01D 61/027* (2013.01); *B01D 67/0018* (2013.01); *B01D 71/52* (2013.01); *B01D 2325/14* (2013.01); *B01D 2325/30* (2013.01)

(58) Field of Classification Search
  CPC .... B01D 69/12; B01D 69/02; B01D 67/0093; B01D 61/025; B01D 71/52; B01D 61/027; B01D 2325/14; B01D 2325/30; B01D 67/0018; C02F 1/442; C02F 1/441
  See application file for complete search history.

(56) References Cited

U.S. PATENT DOCUMENTS

| | | | |
|---|---|---|---|
| 4,277,344 A | 7/1981 | Cadotte | |
| 4,990,252 A * | 2/1991 | Tomaschke | B01D 67/0011 210/321.83 |
| 9,211,509 B2 * | 12/2015 | Higashi | B01D 69/02 |
| 2007/0163951 A1 * | 7/2007 | McGrath | B01D 61/025 210/500.41 |
| 2010/0055534 A1 * | 3/2010 | Tamaki | B01D 67/0009 429/524 |
| 2011/0174728 A1 | 7/2011 | Eisen et al. | |
| 2012/0225960 A1 | 9/2012 | Mickols et al. | |

FOREIGN PATENT DOCUMENTS

| | | |
|---|---|---|
| JP | 55-147106 A | 11/1980 |
| JP | 62-95105 A | 5/1987 |
| JP | 63-248409 A | 10/1988 |
| JP | 3250644 B2 | 1/2002 |
| JP | 2005-44610 A | 2/2005 |
| JP | 2007-2099 A | 1/2007 |
| JP | 2013-31834 A | 2/2013 |
| JP | 2013-31836 A | 2/2013 |
| JP | 2013-223852 A | 10/2013 |
| WO | 2013/005551 A1 | 1/2013 |

OTHER PUBLICATIONS

International Search Report dated Feb. 18, 2014, issued in International Application No. PCT/JP2013/083166. (2 pages).
Non-Final Office Action dated Jun. 12, 2017, issued in U.S. Appl. No. 14/647,266 (13 pages).
Non-Final Office Action dated Nov. 22, 2017, issued in U.S. Appl. No. 14/647,266. (15 pages).
Non-Final Office Action dated Nov. 8, 2018, issued in U.S. Appl. No. 14/647,266. (16 pages).
Final Office Action dated May 11, 2018, issued in U.S. Appl. No. 14/647,266. (17 pages).
Lee et al., "Disulfonated poly(arylene ether sulfone) random copolymer thin film composite membrane fabricated using a benign solvent for reverse osmosis applications", Journal of Membrane Science, vol. 389, 2012, pp. 363-371.
International Search Report dated Oct. 29, 2013 issued in corresponding application No. PCT/JP2013/072154.

* cited by examiner

[Fig. 1]
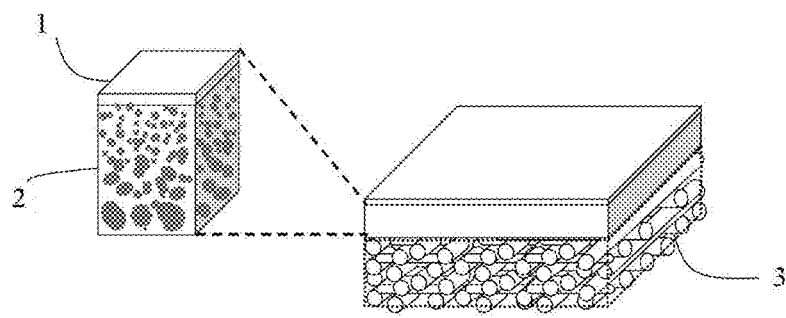
[Fig. 2]
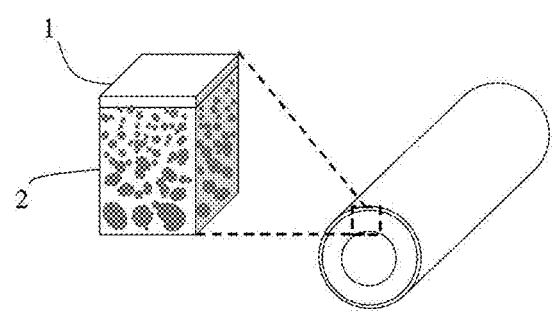
[Fig. 3]
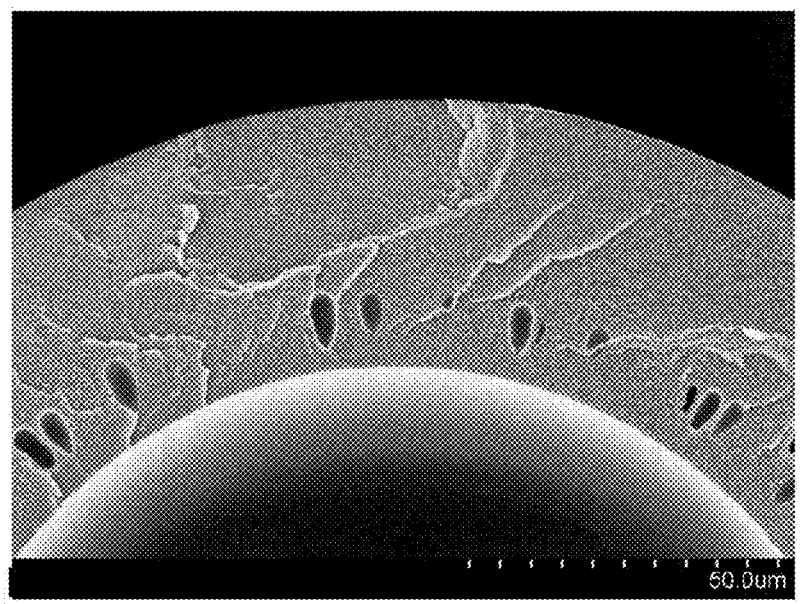

[Fig. 4]
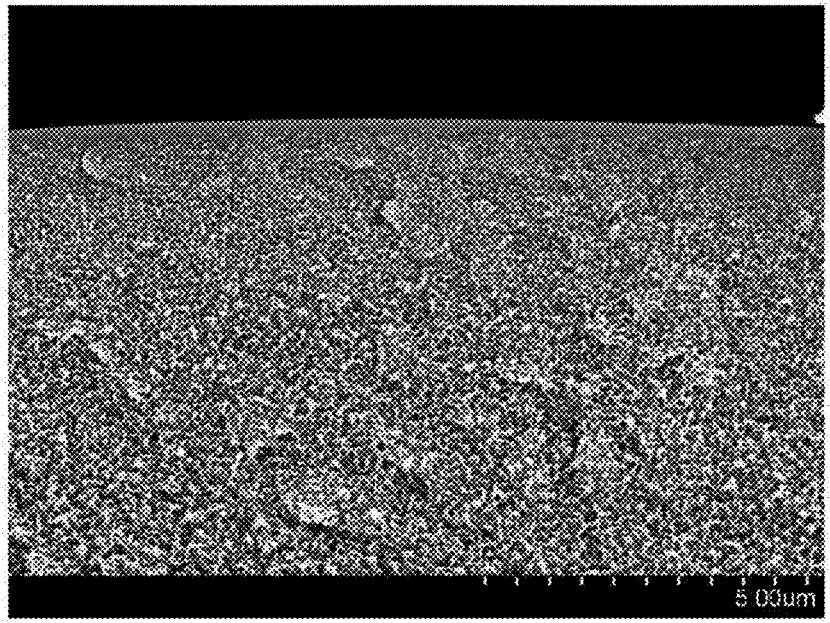
[Fig. 5]
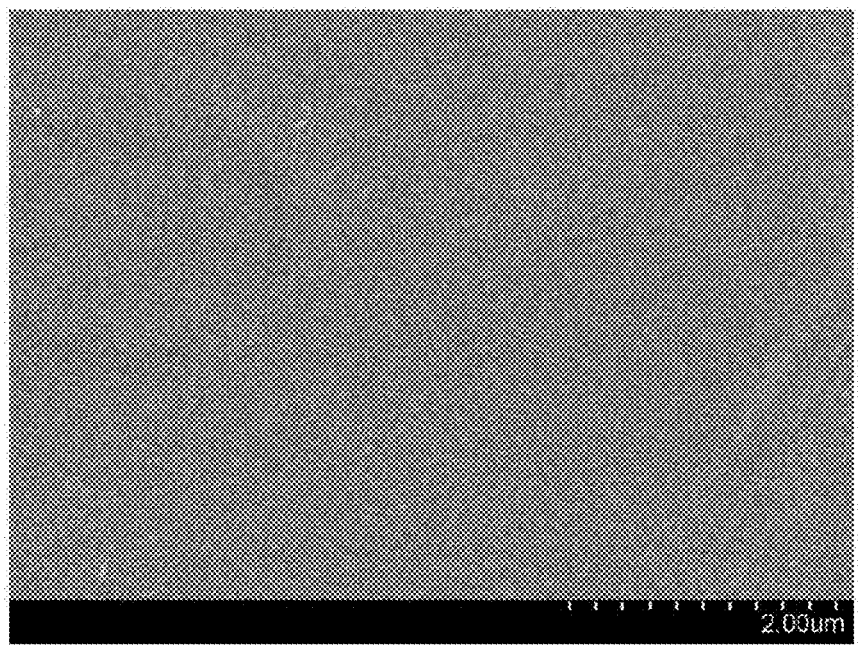

COMPOSITE SEPARATION MEMBRANE

RELATED APPLICATION

This application is a national stage entry of PCT/JP2013/072154, filed Aug. 20, 2013 which claims priority of Japanese Patent Application No. 2012-221891, filed Oct. 4, 2012, which are incorporated by reference in their entirety.

TECHNICAL FIELD OF THE INVENTION

The present invention relates to a long-life composite separation membrane having an excellent separation property and water permeation property as a liquid treating membrane, particularly as a nanofiltration membrane and a reverse osmosis membrane and having excellent resistance to chlorine and resistance to alkali. It also relates to a method for manufacturing the same.

BACKGROUND ART

A nanofiltration membrane and a reverse osmosis membrane have such a filmy structure that a pore size of membrane thereof is in an order of from nanometers to angstroms or that being considered to have no clear pore. Therefore, their resistance to filtration is large and permeation flow rate of water is apt to become small. Accordingly, as to a nanofiltration membrane and a reverse osmosis membrane, a structure of a composite separation membrane having both of high water permeation property and separation property has been preferably used, wherein thin film having a separation function is formed as thin as possible and without deficiency on the surface of a porous support membrane being excellent in mechanical strength and water permeation property. In addition, a polymer which constitutes the separation layer has been demanded to be excellent in the resistance to chemicals or, particularly, in the resistance to chlorine and alkali in view of washability and stability for a long-term use.

As to the structure of the conventional main composite separation membranes, there is a structure wherein thin membrane of cross-linked aromatic polyamide is formed on the surface of a porous support membrane by means of an interfacial polymerization method. For example, in Patent Document 1, there is disclosed a composite product in a sheet form wherein thin film of cross-linked polyamide is formed on the surface of a porous support membrane by means of interfacial polymerization.

In Patent Document 2, there is disclosed a hollow fiber composite separation membrane wherein thin film of cross-linked polyamide is formed on the surface of a porous support membrane in a hollow fiber form by means of interfacial polymerization.

In Patent Document 3, there is also disclosed an art for forming a hollow fiber composite separation membrane wherein thin film of cross-linked polyamide is formed on the surface of a porous support membrane in a hollow fiber form by means of interfacial polymerization. In said art, a step of impregnating a liquid containing a fluorine compound is added to a step of compositing by means of interfacial polymerization so as to form a hollow fiber composite separation membrane having more uniform separation layer.

As to a synthetic polymer other than the polyamide-type materials which can be applied to a nanofiltration membrane or a reverse osmosis membrane, there is a polymer having an ionic functional group such as sulfonic group in a molecule. For example, in Patent Document 4, there is disclosed an art for preparing a composite separation membrane wherein a sulfonated polyarylene ether is dissolved in a solvent consisting of formic acid and the resulting coating solution is applied on the surface of a porous support membrane followed by drying to form a coat.

However, although the nanofiltration membrane and reverse osmosis membrane using a polyamide-type composite separation membrane as mentioned in Patent Document 1 are excellent in their salt rejection property and water permeation property, their resistance to chlorine is low whereby it is impossible to treat water containing sodium hypochlorite and it is also impossible to be washed with chlorine. Therefore, it is necessary to subject a supplying solution from which sodium hypochlorite has been once removed to a desalting treatment using the separation membrane and then to add sodium hypochlorite again to the resulting filtered solution, which leads to a problem that a filtering process is complicated and the cost therefor is high.

In Patent Documents 2 and 3, there is also a disadvantage that resistance to chlorine is low because of a polyamide-type composite separation membrane. Moreover, there is also a problem that a process wherein the structure formation is conducted by an interfacial polymerization reaction in a step of manufacturing a composite separation membrane of a hollow fiber type is complicated a compared with a flat membrane or a sheet-shaped product.

A composite separation membrane having a sulfonated polyarylene ether (SPAE) in a separation layer as in Patent Document 4 is very excellent in the resistance to chlorine due to its high chemical stability of the polyarylene ether molecule skeleton. Therefore, it is preferred in practical use because it can be washed with sodium hypochlorite.

However, as pointed out in Non-Patent Document 1 for example, since SPAE is similar to polysulfone or polyether sulfone which is a polymer material for common porous support membranes in terms of the chemical structure, most of solvents which can dissolve SPAE also can dissolve polysulfone or polyether sulfone. When the solvent as such is used as a coating solution and applied on a porous support membrane, there is resulted a problem that the porous support membrane is dissolved or significantly swollen whereby no composite membrane is prepared.

Accordingly, it is inevitable to select a limitative solvent (lower carboxylic acid such as formic acid, alcohol, alkylene diol or triol, or alkylene glycol alkyl ether) which does not invade a porous support membrane formed of polysulfone or polyether sulfone. However, such a solvent should also tends to become low solubility to SPAE. Particularly, the allowable range of solubility of a solvent to SPAE having more rigid molecular skeleton is narrow. When a composite separation membrane is prepared using such a solvent having insufficient solubility, a coat of SPAE cannot firmly adheres to a porous support membrane and the separation property tends to become insufficient whereby there is a problem that lowering of the property for long period due to exfoliation is apt to happen.

PRIOR ART DOCUMENTS

Patent Documents

Patent Document 1: Japanese Patent Application Laid-Open (JP-A) No. 147106/80
Patent Document 2: Japanese Patent Application Laid-Open (JP-A) No. 95105/87
Patent Document 3: Japanese Patent No. 3250644
Patent Document 4: Japanese Patent Application Laid-Open (JP-A) No. 248409/88

Non-Patent Documents

Non-Patent Document 1: Chang Hyun Lee et al., Journal of Membrane Science, 389 (2012), 363-371, "Disulfonated poly(arylene ether sulfone) random copolymer thin film composite membrane fabricated using a benign solvent for reverse osmosis applications"

DISCLOSURE OF THE INVENTION

Problem that the Invention is to Solve

The present invention has been done for overcoming the above-mentioned conventional technical problem and an object of the present invention is to provide a composite separation membrane having a separation layer formed of SPAE on the surface of a porous support membrane wherein the porous support membrane and a coat of SPAE are firmly adhered with each other so that separation property and water permeation property continue for a long period; and also to provide an advantageous method for manufacturing the same.

Means for Solving the Problem

For a composite separation membrane formed of a combination of polymer which constitutes the porous support membrane with SPAE which constitutes a separation layer, the present inventors have firstly investigated the solubility of each polymer in a solvent, the compositing process and the property as a composite separation membrane. Polysulfone (PSU) or polyether sulfone (PES) shows a good solubility in N-methyl-2-pyrrolidone (NMP), N,N-dimethylacetamide (DMAc), dimethyl sulfoxide (DMSO), N,N-dimethylformamide (DMF), γ-butyrolactone (GBL) and a mixed solvent containing at least one of them (hereinafter, the above is referred to as "solvent group 1") among aprotic polar solvents. Those solvents have excellent dissolving property, exhibit a relatively small environmental load, show high safety to human body. Accordingly, they are preferred as membrane-forming solvents for preparing a porous support membrane. On the other hand, SPAE which constitutes a separation layer also shows a good solubility in the solvent group 1. Accordingly, it has been impossible to use the solvent group 1as a main component of a coating solution when a composite membrane is to be prepared by a coating method. Moreover, although polyvinylidene fluoride (PVDF) and polyether imide (PEI) can be exemplified as other engineering polymer which is commonly used for a porous support membrane, those polymers are also soluble in the solvent group 1 as same as in the case of the above polysulfone and polyether sulfone whereby there is also the same problem therein.

Therefore, search has been conducted for a solvent which dissolves SPAE of a separation layer but does not dissolve a polymer of a porous support layer. However, choice alternatives are not always so many. To be more specific, a part of protonic polar solvent such as lower carboxylic acid (e.g. formic acid), alcohol, alkylene diol or triol and alkylene glycol alkyl ether (hereinafter, they will be referred to as a solvent group 2) will be exemplified.

However, there are many cases wherein the solubility of SPAE in the above solvent group 2 is not always good. In addition, with regard to the solvents having a relatively good solubility for SPAE in the solvent group 2, their affinity to a porous support membrane tends to become high and, even if they do not dissolve the porous support membrane, there is a problem that they significantly swell it resulting in a decrease of its mechanical strength. Even if an improvement is done such as that an appropriate amount of the solvent group 1 is added in order to enhance the solubility of the solvent group 2 for SPAE, it results in a significant swelling of the porous support membrane and is not preferred. When a compositing is conducted by a coating method using a solvent exhibiting poor solubility, there is a problem that separation property of a composite membrane becomes insufficient while, when a solvent exhibiting good solubility is used, careful attention is needed so as not to excessively swell the porous support membrane (An excessive swelling results in generation of the deficiency and breakage of the composite separation membrane). Therefore, it is necessary that the drying temperature after the coating is made low (for example, at about 100° C. or lower) and, as a result, there is a problem that no dense coat is formed and no sufficient separation property is achieved. Moreover, although formic acid in the solvent group 2 exhibits relatively good solubility for SPAE, it is not preferred in view of handling ability since it is highly toxic and has corrosive property.

In addition, in SPAE having a chemical structure suitable for the use as composite separation membrane, its solubility in a solvent is further limited. Recently, in view of stable achievement of higher ion separation property in nanofiltration and reverse osmosis, SPAE which is subjected to molecular design by means of a direct copolymerization has been developed. To be more specific, SPAE of a chemical structure having more rigid molecular skeleton and stronger cohesive force of a hydrophobic segment is preferred since it achieves better mechanical property, less swelling and higher ion separation property.

However, when such a desirable chemical structure of SPAE is aimed, glass transition temperature of a polymer becomes higher whereby its solubility in a solvent lowers. For example, SPAE having a repeating structure constituted from a repeating unit of a hydrophobic segment represented by the following formula (I) and a repeating unit of a hydrophilic segment represented by the following formula (II) exhibits an excellent mechanical property due to a rigid molecular skeleton and a high cohesive force of the hydrophobic segment (I) and can form a coat exhibiting little swelling whereby said SPAE is suitable to be used for nanofiltration and reverse osmosis. However, there is a problem that, although said SPAE is soluble in a solvent group 1, it is almost insoluble in a solvent group 2.

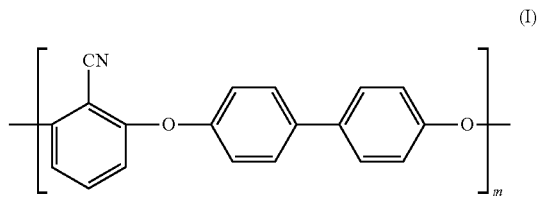

(I)

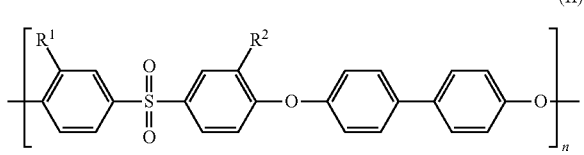

(II)

wherein m and n each represents a natural number of 1 or more;

$R^1$ and $R^2$ each represents —$SO_3M$ or —$SO_3H$, wherein M represents a metal element; and a sulfonation rate in terms of a percent rate of repeating number of the formula (II) in the sulfonated polyarylene ether copolymer to total of repeating number of the formula (I) and repeating number of the formula (II) in the sulfonated polyarylene ether copolymer is more than 5% and less than 80%.

Thus, when a composite separation membrane is to be prepared using SPAE which has an excellent separation property but has a low solubility in a solvent, it is not possible to use the solvent group 2 as a coating solvent whereby the solvent group 1 having a high solubility shall have to be used. For such a purpose, a porous support membrane which is insoluble in the solvent group 1 is inevitable whereby the above-mentioned known porous support membrane cannot be used.

Under such circumstances, the present inventors have tried to find a polymer which is insoluble in the solvent group 1 and is suitable for a porous support membrane of a composite separation membrane. They have repeatedly investigated by preparing a composite separation membrane on which the above-mentioned SPAE is coated. It is preferred that a porous support membrane can support the thin separation layer under the pressure upon a separation operation (0.1 to 8.0 MPa) and can be used for a long period. It is an inevitable condition to use a polymer having excellent mechanical strength and durability to chemicals. Further, it is preferred that the porous support membrane has appropriate solubility in a solvent and that a membrane having a pore size within an extent of an ultrafiltration membrane being suitable as a porous support membrane of a composite separation membrane can be easily prepared by means of a known wet or dry-and-wet method for membrane preparation. In order to achieve a high mechanical strength, a polymer having a high glass transition temperature is preferred. Further, in order to achieve an appropriate solubility in a solvent, an amorphous polymer is preferred. Thus, to be more specific, a porous support membrane using an amorphous aromatic polymer is preferred.

Table 1 shows solubility, etc. of known typical polymers in aprotic polar solvents.

It has been known that, generally, solubility of crystalline and semicrystalline polymers having high crystallization degree in a solvent is poor. Although polyphenylene sulfide (PPS), polyether ether ketone (PEEK) or the like has been known as a crystalline polymer having excellent mechanical strength and durability to chemicals, such a one is inherently insoluble in most of known solvents except inorganic acids. Accordingly, although it can be subjected to a melt molding, it is not suitable for a wet membrane preparation whereby it is not easy to prepare a porous support membrane suitable for a composite membrane. As to an amorphous aromatic polymer, although polyether imide (PEI), polysulfone (PSU) and polyether sulfone (PES) have appropriate solubility in a solvent, they are soluble in the solvent group 1. Although polyvinylidene fluoride (PVDF) is a crystalline polymer, it is a non-aromatic polymer and exhibits low glass transition temperature and, although it has an appropriate solubility in a solvent, it is still soluble in the solvent group 1.

Among the known amorphous aromatic polymers, the present inventors have paid their attention to a special solubility in a solvent shown by polyphenylene ether (PPE). It has been found that polyphenylene ether is not soluble in the solvent group 1 or exhibits a limited solubility therein and that it is a suitable polymer as a porous support membrane for achieving the object of the present invention.

To be more specific, polyphenylene ether is absolutely insoluble in dimethyl sulfoxide (DMSO) or γ-butyrolactone (GBL) among the solvent group 1 of aprotic polar solvents. On the other hand, although polyphenylene ether is insoluble in N-methyl-2-pyrrolidone (NMP), dimethylacetamide (DMAc) and N,N-dimethylformamide (DMF) at least at ordinary room temperature, it is soluble therein at the selected high temperature region as will be mentioned later. Due to this fact, polyphenylene ether has such a characteristic that a porous support membrane can be easily prepared therefrom. Therefore, when a porous support membrane formed of polyphenylene ether is used, a porous support membrane is not invaded even when a coating solution prepared by dissolving SPAE in the solvent group 1 is applied thereon. Further, it has been found amazingly that, when a combination of suitable solvents from the solvent group 1 is selected, a polyphenylene ether porous support membrane is not excessively swollen by the solvent and accordingly that, even when the solvent is quickly dried at

TABLE 1

| | Kind of polymer | Abbreviation | Glass transition point $T_g$ ° C. | Melting point $T_m$ ° C. | Solubility in aprotic polar solvent (solvent group 1) | | | | |
|---|---|---|---|---|---|---|---|---|---|
| | | | | | NMP | DMAc | DMF | GBL | DMSO |
| Amorphous | polyether sulfone | PES | 225 | — | possible | possible | possible | possible | possible |
| | polysulfone | PSU | 190 | — | possible | possible | possible | possible | possible |
| | polyether imide | PEI | 218 | — | possible | possible | possible | possible | possible |
| | polyamide imide | PAI | 275 | — | possible | possible | possible | possible | possible |
| | polyphenylene ether | PPE | 210 | — | impossible (possible only at high temperature) | impossible (possible only at high temperature) | impossible (possible only at high temperature) | impossible | impossible |
| Crystalline | polyvinylidene fluoride | PVDF | −35 | 168-180 | possible | possible | possible | possible | possible |
| | polyphenylene sulfide | PPS | 93 | 280 | impossible | impossible | impossible | impossible | impossible |
| | polyether ether ketone | PEEK | 145 | 334 | impossible | impossible | impossible | impossible | impossible | relatively high temperature in a drying step after coating, breakage of a membrane and decrease in the property hardly happen. Such a finding is a big advantage in a method for the manufacture of a composite separation membrane. It is now possible to stably and easily form a dense separation layer of SPAE having an excellent separation ability provided that the solvent is quickly dried at high temperature (100° C. or higher) even in the case of the solvent group 1 having relatively high boiling point (150 to 210° C.). It has been also found that, since the solubility of SPAE in the solvent group 1 is good whereby stability of a solution can be maintained even when a desired non-solvent is added to a considerable extent (such as 50% by weight or more) and accordingly that vapor pressure and surface tension of a coating solution can be controlled to a desired condition and a composite separation membrane suitable to be used for nanofiltration and reverse osmosis can be prepared.

The present invention has been achieved on the basis of the above finding and has the following constitutions (1) to (5).

(1) A composite separation membrane having a separation layer on the surface of a porous support membrane, characterized in that said porous support membrane contains 50% by mass or more of polyphenylene ether, and that said separation layer is formed of a sulfonated polyarylene ether copolymer constituted from a repeating structure of a hydrophobic segment and a hydrophilic segment.

(2) The composite separation membrane according to (1), wherein said sulfonated polyarylene ether copolymer is constituted from a repeating structure of a hydrophobic segment represented by the following formula (IV) and a hydrophilic segment represented by the following formula (V):

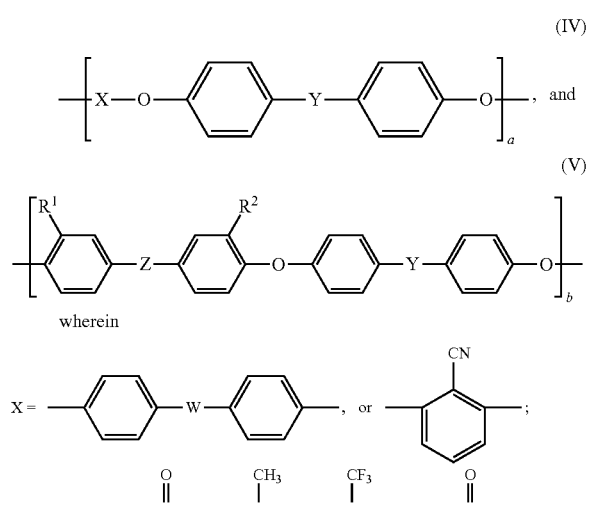

wherein

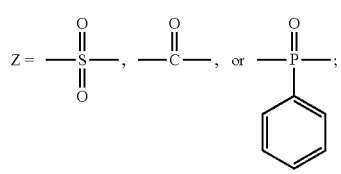

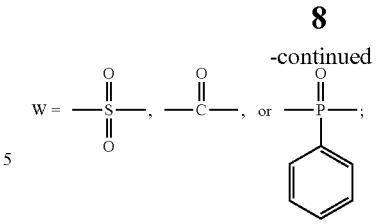

Y and W are not selected as the same thing;
a and b each represents a natural number of 1 or more;
$R^1$ and $R^2$ each represents —$SO_3M$ or —$SO_3H$, wherein M represents a metal element; and
a sulfonation rate in terms of a percent rate of repeating number of the formula (V) in the sulfonated polyarylene ether copolymer to total of repeating number of the formula (IV) and repeating number of the formula (V) in the sulfonated polyarylene ether copolymer is more than 5% and less than 80%.

(3) The composite separation membrane according to (1), wherein said sulfonated polyarylene ether copolymer is constituted from a repeating structure of a hydrophobic segment represented by the following formula (I) and a hydrophilic segment represented by the following formula (II):

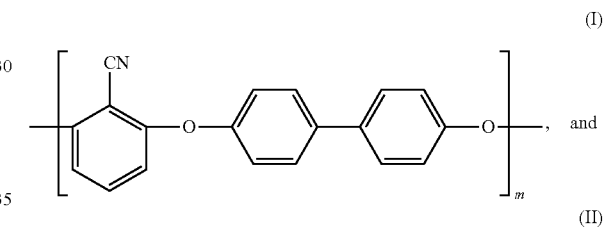

wherein m and n each represents a natural number of 1 or more;
$R^1$ and $R^2$ each represents —$SO_3M$ or —$SO_3H$, wherein M represents a metal element; and
a sulfonation rate in terms of a percent rate of repeating number of the formula (II) in the sulfonated polyarylene ether copolymer to total of repeating number of the formula (I) and repeating number of the formula (II) in the sulfonated polyarylene ether copolymer is more than 5% and less than 80%.

(4) The composite separation membrane according to any of (1) to (3), wherein content of the polyphenylene ether in the porous support membrane is 80% by mass or more.

(5) A method for manufacturing the composite separation membrane mentioned in any of (1) to (4), characterized in that, a coating solution is applied on the surface of a porous support membrane containing 50% by mass or more polyphenylene ether, wherein said coating solution has been prepared by dissolving a sulfonated polyarylene ether copolymer in an aprotic polar solvent containing at least one member selected from the group consisting of dimethyl sulfoxide, N,N-dimethylacetamide, N,N-dimethylformamide, N-methyl-2-pyrrolidone and γ-butyrolactone; and then the coated surface is subjected to a drying treatment within such a temperature range that said solvent does not dissolve the polyphenylene ether porous support membrane.

Advantages of the Invention

The composite separation membrane in accordance with the present invention is provided with a separation layer formed of a specific SPAE on the surface of a porous support membrane containing polyphenylene ether as a main ingredient. Accordingly, adhesive property between the porous support membrane and the separation layer are very good and, as a result, the composite separation membrane keeps excellent separation property and water permeation property as a nanofiltration membrane and a reverse osmosis membrane, is excellent in the resistance to chlorine and the resistance to alkali and exhibits a long life.

BRIEF DESCRIPTION OF THE DRAWINGS

FIG. 1 shows a schematic drawing (flat membrane) according to the present invention.
FIG. 2 shows a schematic drawing (hollow fiber membrane) according to the present invention.
FIG. 3 is an SEM (scanning electron microscope) image of the cross section of the composite separation membrane of Example 1.
FIG. 4 is an enlarged SEM image of the outer layer part of the cross section of the composite separation membrane of Example 1.
FIG. 5 is an enlarged SEM image of the surface of the composite separation membrane of Example 1.

BEST MODE FOR CARRYING OUT THE INVENTION

The composite separation membrane of the present invention is characterized in that a separation layer exists on the surface of a porous support membrane, that the porous surface membrane contains polyphenylene ether as a main ingredient and that the separation layer is formed of a sulfonated polyarylene ether copolymer constituted from a specific repeating structure.

The composite separation membrane of the present invention is suitable as a liquid treating membrane or particularly as a nanofiltration membrane and a reverse osmosis membrane. Nanofiltration membrane and reverse osmosis membrane are separation membranes having a dense filmy separation layer wherein pore size is several nm or less or no clear pore is considered to exist and are used for separation of a low-molecular organic molecule such as glucose or a solute of inorganic salt from a solution. A nanofiltration membrane has larger pore size than a reverse osmosis membrane and is a liquid treating membrane which can partly remove low-molecular organic molecule and uni- and poly-valent ion. A reverse osmosis membrane has smaller pore size than a nanofiltration membrane and is a liquid treating membrane which can separate and remove even univalent ion such as sodium ion almost completely.

The composite separation membrane of the present invention is such a membrane wherein a thin film formed of a polymer having a separation property for a size being near that of target fractionating substance is formed on the surface of a porous support membrane formed of a hydrophobic polymer having sufficiently larger pores than the size of the target substance to be fractionated (diameter: about 10 nm to about several hundred nm). The composite separation membrane of the present invention is constituted from at least two kinds of polymers. It is possible to clearly discriminate each of the polymers constituting the separation layer and the porous support membrane. In the case of a flat membrane as shown by FIG. 1, a porous support membrane 2 is placed on nonwoven fabric 3 such as polyester and a thin film of a separation layer 1 is further formed on the surface of the porous support membrane 2. In the case of a hollow fiber membrane as shown by FIG. 2, a thin film of a separation layer 1 is formed on a porous support membrane 2 in a hollow fiber form. Here, a thin film stands for a film in the thickness of about 5 nm to 1 µm. Thickness of a porous support membrane is well thicker than a thin film and is at least 5 µm.

On the other hand, as a membrane structure which is different from a composite separation membrane of the present invention, there is an asymmetric membrane. An asymmetric membrane is a membrane prepared by coagulation of a dope for membrane preparation by means of a phase separation method, and is controlled so as to make the surface layer of a membrane dense and, the inner layer side of the membrane porous. Although an asymmetric membrane may be constituted from one or more kind (s) of polymer component(s) using a polymer blending method or the like, it is basically a membrane prepared only by controlling the gradient of polymer density in the membrane and, in the separation layer and the porous support layer, the polymer component(s) is/are the same. It is general that, in a composite separation membrane, structure and thickness of the porous support membrane and structure and thickness of the separation layer can be independently controlled and, therefore, water permeation property becomes higher whereby it is preferred as a membrane structure.

Now a porous support membrane and a separation layer of the composite separation membrane of the present invention and a method for manufacturing the same will be successively illustrated in detail.

Polyphenylene ether used in a porous support membrane of the composite separation membrane of the present invention is represented by the following formula (III).

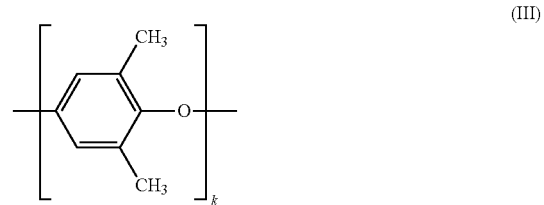

In the above formula (III), k is a natural number of 1 or more.

Number-average molecular weight of polyphenylene ether is preferred to be 5,000 to 500,000. Within such a range, it is soluble at high temperature in a part of aprotic polar solvents shown in the above-mentioned solvent group 1 and viscosity of a dope for membrane preparation becomes sufficient whereby a porous support membrane having sufficient strength can be prepared.

In view of enhancing the strength of a porous support membrane or optimizing the membrane property, the polyphenylene ether may be subjected to a polymer blending using polystyrene which has been known to be completely compatible with polyphenylene ether or using various kinds of polymers. Alternatively, a filler may be contained in polyphenylene ether. Further, in view of imparting the hydrophilicity to a porous membrane of polyphenylene ether which is a hydrophobic polymer, ionic surfactant, nonionic surfactant or a hydrophilic polymer such as polyethylene glycol or polyvinylpyrrolidone may be contained therein. However, the rate of polyphenylene ether constituting a porous support membrane is preferred to be 50% by mass or more. It is more preferred to be 80% by mass or more. When it is within the above range, a polyphenylene ether porous support membrane is not invaded by a solvent group 1 but the characteristic of polyphenylene ether which is high mechanical strength and resistance to chemicals is still maintained whereby it is advantageous in the step for the manufacture of a composite separation membrane.

As to a solvent for the preparation of a porous support membrane from polyphenylene ether, N-methyl-2-pyrrolidone (NMP), N,N-dimethylacetamide (DMAc) and N,N-dimethylformamide (DMF) are preferred among the aprotic polar solvents of the solvent group 1 since they are the so-called "latent solvents" which can afford a uniform dope for membrane preparation at high temperature of, for example, about 60° C. or higher while, at the temperature of lower than the above, polyphenylene ether is insoluble therein. However, with regard to the temperature range wherein polyphenylene ether is soluble in the latent solvents, it may vary depending upon molecular weight of the polyphenylene ether, polymer concentration of the dope for membrane preparation and interaction among the separately added substance, polymer and latent solvent and, accordingly, it should be appropriately adjusted. Among the above, N-methyl-2-pyrrolidone is particularly preferred since the stability of the dope for membrane preparation is good. On the other hand, dimethyl sulfoxide, γ-butyrolactone, etc. among the solvent group 1 are the non-solvents which do not dissolve polyphenylene ether even under the temperature condition of as high as 100° C. or higher whereby they are not so preferred as the solvents for membrane preparation for preparing a porous support membrane.

The "latent solvent" in the present invention is such a solvent that, in a dope for membrane preparation of a porous support membrane, there exists Flory's theta temperature inherent to the solvent (temperature by which interaction acting among the segments of polymer chain is apparently zero or, in other words, temperature wherein the second virial coefficient is zero) to the polymer which is a solute (it is polyphenylene ether in the present invention) and the theta temperature is ordinary room temperature or lower than a boiling point of the solvent. When the temperature is higher than the theta temperature, a uniform dope for membrane preparation is obtained while, when it is lower than the theta temperature, the polymer is insoluble in a solvent. Actually, the apparent theta temperature of a dope for membrane preparation in the present invention varies to some extent depending upon the polymer concentration and the solvent composition. The term "good solvent" stands for such a solvent wherein, in a dope for membrane preparation, repulsive force acting among the segments of polymer chain is more than attractive force and a uniform dope for membrane preparation can be obtained at ordinary room temperature regardless of the temperature. The term "non-solvent" stands for such a solvent wherein there exists no theta temperature or theta temperature is extremely high whereby the polymer is entirely insoluble regardless of the temperature.

As to polyphenylene ether, it has been known that, besides the above-mentioned latent solvents, there exists also good solvents in which polyphenylene ether is soluble even at ordinary room temperature and, as summarized in known literatures (for example, please refer to G. Chowdhury, B. Kruczek, T. Matsuura, Polyphenylene Oxide and Modified Polyphenylene Oxide Membranes Gas, Vapor and Liquid Separation, 2001, Springer), non-polar solvents (hereinafter, abbreviated as the solvent group 3) such as carbon tetrachloride, carbon disulfide, benzene, toluene, chlorobenzene, dichloromethane and chloroform have been known. However, unlike the above-mentioned solvent group 1, although those solvents can dissolve polyphenylene ether at ordinary room temperature, environmental load is big and harmfulness to human body is also very high whereby its industrial use as a dope for membrane preparation is not preferred.

As to a means for preparing a porous support membrane from a dope for membrane preparation wherein polyphenylene ether is dissolved in the above latent solvent, it is preferred to use a wet method for membrane preparation and a dry-and-wet method for membrane preparation. A wet method for membrane preparation is such a method wherein a dope for membrane preparation in a homogeneous solution form is immersed in a coagulation bath consisting of a non-solvent which is miscible with good solvent in the dope but polymer is insoluble therein and then a polymer is subjected to a phase separation to separate therefrom whereupon a membrane structure is formed. A dry-and-wet method for membrane preparation is such a method wherein, immediately before the dope is immersed in a coagulation bath, a solvent is evaporated/dried for a predetermined period from the surface of the dope to give an asymmetric structure wherein polymer density on the membrane surface layer becomes much dense. In the present invention, it is more preferred to choose a dry-and-wet method for membrane preparation.

In a composite separation membrane of the present invention, although the shape of the membrane is not particularly limited, it is preferred to be a flat membrane or a hollow fiber membrane. Any of the membrane as such may be prepared by a conventional method which has been known by persons skilled in the art. In the case of a flat membrane for example, it can be prepared by such a manner that a dope for membrane preparation is subjected to casting on a substrate followed, if desired, by giving a drying period for a predetermined period and is then immersed in a coagulation bath. In the case of a hollow fiber membrane, it can be prepared by such a manner that a dope for membrane preparation is discharged from outer slits of spinning nozzles of a double cylindrical type so that the dope becomes in a hollow cylindrical shape while, from inner pores of nozzle inside thereof, a fluid selected from non-solvent, latent solvent, good solvent or a mixed solvent thereof, liquid which is not compatible with a solvent for membrane preparation and gas such as nitrogen or air is extruded together with the dope followed, if desired, by giving a drying period for a predetermined period and is then immersed in a coagulation bath.

Concentration of polyphenylene ether in a dope for membrane preparation is preferred to be 5% by mass to 60% by mass in such a view that mechanical strength of a support membrane is kept sufficient and, at the same time, water permeation property and surface pore size of the porous support membrane are made appropriate. It is more preferred to be 10% by mass to 50% by mass.

Temperature of the dope for membrane preparation is preferred to be 40° C. or higher. It is more preferred to be 60° C. or higher. Upper limit of the temperature is preferred to be the boiling point of the above solvent for membrane preparation or lower, more preferred to be 150° C. or lower, and further preferred to be lower than 100° C. When the temperature of the dope for membrane preparation is lower than the above range, temperature of polyphenylene ether becomes the above-mentioned theta temperature or lower and polymer is separated out whereby it is not preferred. In view of the experience of the present inventors, a solidified product of polyphenylene ether prepared when the above dope for membrane preparation is allowed to stand at theta temperature or lower is fragile whereby it is not preferred as a separation membrane. More preferred membrane structure can be obtained rather by such a means that the dope which is at the theta temperature or higher and is in a homogeneous state is immersed in a coagulation bath filled with non-solvent, leading to non-solvent-induced phase separation and membrane structure formation. On the other hand, when temperature of the dope for membrane preparation is too higher than the above range, viscosity of the dope lowers and shape forming becomes difficult whereby it is not preferred. There also happens such a problem thereby for example that, since evaporation rate of good solvent in the dope and solvent exchange rate in the coagulation bath become too high, polymer density on the membrane surface becomes too dense whereby water permeation property as a support membrane significantly lowers.

In a dry-and-wet membrane preparation method, a predetermined drying time for the solvent is given before a step wherein a dope for membrane preparation is immersed in a coagulation bath. Drying time and temperature are not particularly limited but should be adjusted in such a manner that the finally obtained asymmetric structure of a porous support membrane becomes a desired one. It is preferred that, for example, the solvent is partly dried for 0.01 to 600 second(s) at the environmental temperature of 5 to 200° C.

With regard to non-solvent for a coagulation bath used for a wet membrane preparation method or a dry-and-wet membrane preparation method, it is not particularly limited and, in accordance with the known membrane preparation method, it is preferred to be water, alcohol and polyhydric alcohol (such as ethylene glycol, diethylene glycol, triethylene glycol or glycerol). A mixed liquid thereof is also acceptable. In view of simplicity and economy, it is preferred that water is contained therein as a component.

Similarly, other substance may be also added to the non-solvent of the coagulation bath in accordance with the known membrane preparation method. For example, in such a view that a solvent exchange rate in a coagulation process is controlled and a membrane structure is made into a preferred one, a solvent in the solvent group 1 or, particularly, a latent solvent such as N-methyl-2-pyrrolidone or N,N-dimethylacetamide may be preferably added to a coagulation bath. In addition, polysaccharide, water-soluble polymer or the like may also be added in order to control the viscosity of a coagulation bath.

Temperature of a coagulation bath is not particularly limited but may be appropriately selected in view of controlling the pore size of a porous support membrane or in view of economy and safe operation. To be more specific, a range of from 0° C. to lower than 100° C. is preferred, and a range of from 10° C. to 80° C. is more preferred. When the temperature is lower than the above range, viscosity of a coagulation bath becomes too high whereby a de-mixing process proceeds in more retarded manner and, as a result, the membrane structure becomes dense and water permeation property of the membrane tends to lower and, accordingly, it is not preferred. When the temperature is higher than the above range, a de-mixing process proceeds more instantly and, as a result, the membrane structure becomes rough and the membrane strength tends to lower and, accordingly, it is not preferred.

With regard to the time for immersing in a coagulation bath, it is adjusted to such time that the structure of a porous support membrane is sufficiently produced due to a phase separation. In such a view that the coagulation is sufficiently advanced while steps therefor are not made uselessly long, the time is preferred to be within a range of from 0.1 to 1000 second(s). It is more preferred to be within a range of from 1 to 600 second (s).

A porous support membrane which is prepared by completing the membrane structure formation in a coagulation bath is preferred to be washed with water. There is no particular limitation for a washing method with water. A porous support membrane may be immersed in water for sufficient time or may be washed with running water for a predetermined period while being conveyed.

It is preferred that the porous support membrane after being washed with water is subjected to an after-treatment so that it becomes a preferred state for a step of making into a composite membrane which will be mentioned later. For example, a preferable after-treatment is a clogging treatment wherein a liquid such as alcohol, alkylene dial or triol, alkylene glycol alkyl ether or water or a mixed liquid thereof is impregnated with a porous support membrane to clog the pores in the support membrane. As a result of the clogging treatment, it is possible to solve such a problem that, when a coating liquid is applied in a step of making into a composite state, SPAE molecules are excessively permeated into a porous support membrane so that water permeation property lowers. Moreover or alternatively, a liquid used for the clogging treatment acts as a retaining agent for pore size whereby drying/shrinking of the porous support membrane can be suppressed and/or the porous support membrane which is hydrophobic can be kept in a hydrophilized state.

It is preferred that excessive water and solvent in the porous support membrane being subjected to the above clogging treatment are appropriately dried. Conditions for this drying should be appropriately adjusted so as to make the property as a composite separation membrane adequate. To be more specific, it is preferred to dry for about 0.01 second to one night at the temperature of 20 to 200° C.

The resulting porous support membrane is rolled by a winding apparatus, stored and, later, it may be taken out from a rolled state as a separate step and then subjected to a step for making into composite. Alternatively, it may be subjected to a compositing step while being continuously conveyed without using a winding apparatus.

Thickness of a porous support membrane used for a composite separation membrane is preferred to be from 5 μm to 500 μm. When it is thinner than this range, a problem that resistance to pressure is not well secured is apt to happen while, when it is thicker than the range, resistance to water permeation becomes big whereby it is not preferred. It is more preferred to be from 10 μm to 100 μm. In the case of a porous support membrane of a hollow fiber shape, outer diameter of the membrane is preferred to be from 50 μm to 2000 μm. When it is smaller than this range, fluid pressure loss of a permeation liquid or a supply liquid flowing in the inner area of the hollow becomes too big and operation pressure becomes too big whereby it is not preferred. When it is bigger than the range, resistance of the membrane to pressure lowers whereby it is not preferred. It is more preferred to be from 80 μm to 1500 μm.

It is preferred that the SPAE used for a separation layer of the composite separation membrane of the present invention is such a polymer which is prepared by copolymerization of a combination of a hydrophilic monomer having a sulfonic group with a hydrophobic monomer having no sulfonic group. In this SPAE, it is possible to suitably select each of chemical structures for the hydrophilic monomer having a sulfonic group and for the hydrophobic monomer. To be more specific, when a chemical structure having high rigidity is appropriately selected, a coat of SPAE which is hardly swollen and is firm can be formed. Further, when a charging amount of each monomer is adjusted in a copolymerization reaction, the amount of sulfonic group introduced thereinto can be precisely controlled with good reproducibility. As to another method for the production of SPAE, there is such a means wherein known polyarylene ether is sulfonated using sulfuric acid. However, this means has such problems that a precise control of introduction amount of sulfonic group is difficult and that a decrease in molecular weight is apt to happen during the reaction whereby it is not preferred. As to the structure of SPAE prepared by a direct copolymerization, preferable one is such a structure wherein a fundamental skeleton is a polymer constituted from a repeating structure of a hydrophobic segment represented by the following formula (IV) having benzene rings connected with each other by ether bond and a hydrophilic segment represented by the following formula (V). This is because it expresses a rigid molecular skeleton and an excellent resistance to chemicals. Moreover, in a fundamental skeleton of the following formulae (IV) and (V), particularly in such a case wherein X, Y, Z and W are selected from the following combination, the whole molecular structure becomes more rigid, a polymer having a high glass transition temperature can be prepared and good resistance to chemicals can be also maintained whereby it is preferred.

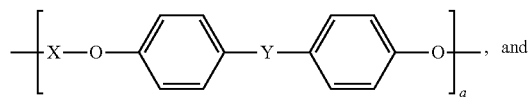
(IV)

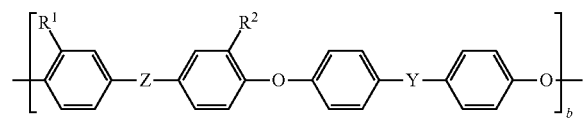
(V)

wherein

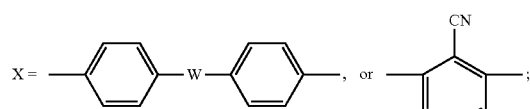

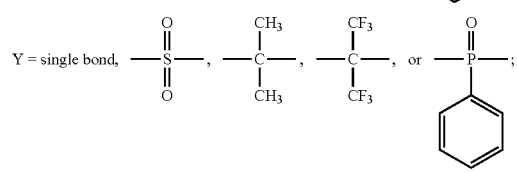

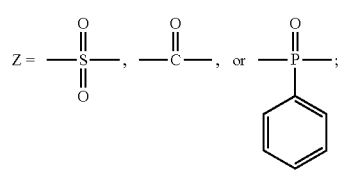

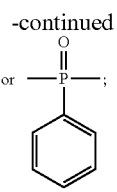
-continued

Y and W are not selected as the same thing;

a and b each represents a natural number of 1 or more;

$R^1$ and $R^2$ each represents —SO$_3$M or —SO$_3$H, wherein M represents a metal element; and a sulfonation rate in terms of a percent rate of repeating number of the formula (V) in the sulfonated polyarylene ether copolymer to total of repeating number of the formula (IV) and repeating number of the formula (V) in the sulfonated polyarylene ether copolymer is more than 5% and less than 80%.

Ion exchange capacity (IEC; milli-equivalent of sulfonic group per 1 g of the sulfonated polymer) of the SPAE having the above chemical structure being preferred for the use as a composite separation membrane is 0.5 to 3.0 meq./g and the preferred range of degree of sulfonation (DS) is more than 5% and less than 80%. Further, it is preferred that glass transition temperature $T_g$ of the polymer in a dry state which is an index for rigidity of the SPAE molecule is 150° C. to 450° C. when measured by a measuring method according to differential scanning calorimetry which will be mentioned later. When the IEC and DS are lower than the above ranges, ion separation property cannot be well expressed since the sulfonic groups are too small. When the IEC and DS are higher than the above ranges, hydrophilicity of the polymer becomes too much and an SPAE separation layer excessively swells whereby it is not preferred. When glass transition temperature is lower than the above range or, in other words, when the rigidity of the SPAE molecule is too small, the SPAE separation layer is apt to be swollen and ion separation property lowers whereby it is not preferred. When glass transition temperature is higher than the above range or, in other words, when the rigidity of the SPAE molecule is too large, solubility in a solvent lowers, dissolution in the solvent group 1 does not take place and there is substantially no choice for a dissolvable solvent whereby it is not preferred. The more preferred ranges of IEC, degree of sulfonation DS, and glass transition temperature $T_g$ are 0.7 to 2.9 meq./g, 10% to 70%, and 200° C. to 400° C., respectively.

It is more preferred that the SPAE used for a separation layer of the present invention is constituted from a repeating structure of a hydrophobic segment represented by the following formula (I) and a hydrophilic segment represented by the following formula (II):

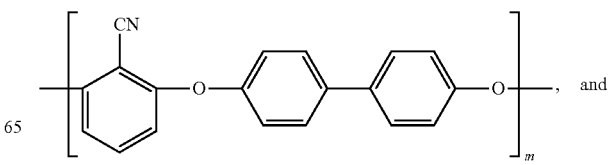
(I)

-continued

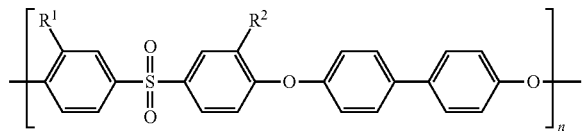
(II)

In the above formulae, m and n each represents a natural number of 1 or more; $R^1$ and $R^2$ each represents —$SO_3M$ or —$SO_3H$, wherein M represents a metal element; and a sulfonation rate in terms of a percent rate of repeating number of the formula (II) in the sulfonated polyarylene ether copolymer to total of repeating number of the formula (I) and repeating number of the formula (II) in the sulfonated polyarylene ether copolymer is more than 5% and less than 80%.

$R^1$ and $R^2$ each in the above formulae (II) and (V) stands for —$SO_3H$ or —$SO_3M$. A metal element M in the latter case is not particularly limited and preferred examples thereof include potassium, sodium, magnesium, aluminum and cesium. More preferred examples of the metal element M include potassium and sodium.

Number-average molecular weight of SPAE represented by the above formulae (I) and (II) as well as (IV) and (V) is preferred to be 1,000 to 1,000,000 in such a view that viscosity of a coating solution is made adequate and that a thin membrane having sufficient separation property and mechanical strength as a separation layer is formed.

In the SPAE represented by the above formulae (I) and (II) as well as (IV) and (V), rigidity of its molecular structure is high whereby it is possible to forma coat having high mechanical strength and being hardly swollen. Accordingly, it is excellent as a composite separation membrane. Further, since the SPAE represented by the above formulae (I) and (II) contains a benzonitrile structure in a hydrophobic segment represented by the formula (I), it has an excellent resistance to chemicals and a cohesive force of the hydrophobic part thereof becomes strong, leading to formation of a coat structure wherein a hydrophilic domain is supported by a firm hydrophobic matrix. As a result, there is achieved a characteristic that swelling of a separation layer is suppressed.

As to a coating solvent for the above SPAE, the preferred one is a solvent containing at least one component selected from dimethyl sulfoxide, N,N-dimethylacetamide, N,N-dimethylformamide, N-methyl-2-pyrrolidone and γ-butyrolactone which are aprotic polar solvents of the solvent group 1. Further, among the solvents of the solvent group 1, dimethyl sulfoxide and γ-butyrolactone are more preferred since they do not dissolve the above-mentioned polyphenylene ether porous support membrane even at high temperature. In addition, a solvent prepared by mixing dimethyl sulfoxide or γ-butyrolactone with any of N,N-dimethylacetamide, N,N-dimethylformamide and N-methyl-2-pyrrolidone may be preferably used as well. Moreover, the structure of a separation layer in a composite separation membrane may be controlled by such means that a solvent having inferior solubility or a solvent having different vapor pressure is added to a solvent of a solvent group 1 to modify the evaporation rate of a coating solution and/or to modify the stability of a solution. For example, a solvent of a solvent group 2 may be contained in a solvent of a solvent group 1.

It is also possible to add known hydrophilic polymers such as polyethylene glycol and polyvinylpyrrolidone thereto in order to modify the viscosity and the hydrophilicity of a coating solution of SPAE. The use of such additives should be conducted as a means within a usual range for making the property of a composite separation membrane adequate by such a manner that, in a coating step, a coating solution just in an appropriate amount is applied on the surface of a porous support membrane and/or that the membrane structure of a composite separation membrane is controlled.

Concentration of the SPAE in a coating solution is not particularly limited but should be appropriately adjusted in order to control the thickness of a separation layer in a composite separation membrane. Although the final thickness of a separation layer is affected, for example, by the applying speed of a coating solution on the surface of a porous support membrane and by the temperature at that time, concentration of the SPAE is preferred to be 0.01 to 20% by mass and more preferred to be 0.1 to 10% by mass. When concentration of the SPAE is too smaller than this range, thickness of a separation layer is too thin and defect is apt to happen whereby it is not preferred. When it is too larger than this range, since thickness of a separation layer is too large and resistance to filtering becomes big, no sufficient water permeation property as a composite separation membrane is achieved whereby it is not preferred. The final thickness of the SPAE separation layer is preferred to be 30 nm to 1 µm and more preferred to be 50 nm to 500 nm.

There is no particular limitation for a method of applying the above-mentioned coating solution on the surface of a porous support membrane but known means may be used. For example, in the case of a flat membrane, a simple method wherein a coating solution is applied on the surface of a porous support membrane using a brush by hand is preferred. As to a more industrial method, it is preferred to use a method wherein a coating solution is applied by a slide bead coater on the surface of a porous support membrane which is continuously conveyed. In the case of a hollow fiber membrane, it is preferred to use a dip-coat method wherein a hollow fiber membrane being continuously conveyed is dipped in a bath filed with a coating solution and then pulled out so as to apply the solution onto the outer surface of the hollow fiber membrane. Alternatively, it is also preferred to use a method wherein a coating solution is inserted into a hollow fiber membrane from the cross section of a module prepared by bundling the hollow fiber membrane and then the coating solution is extruded using gas or it is pulled out in vacuo from one side of the module so as to apply the coating solution onto the inner surface of the hollow fiber membrane.

A coating solution applied onto the surface of a porous support membrane is subjected to a drying treatment whereupon a thin film of SPAE is formed. Although there is no particular limitation for a drying method, there may be used, for example, a method wherein a porous support membrane subjected to a coating treatment is passed for predetermined time into a drying furnace subjected to compulsory convection. Alternatively, drying by means of heating using infrared ray may be conducted. Drying temperature, drying time or ventilation speed in a compulsorily convected drying furnace is a condition which is to be appropriately adjusted so that the property of a composite separation membrane is made into a specific desired value. It may be appropriately adjusted so that the solvent is quickly dried, a porous support membrane is not damaged by excessively high temperature and a composite separation membrane having excellent separation property is achieved.

Although the value demanded as the membrane property of a final composite separation membrane in a practical view may vary depending upon the size of a fractionated object, the affinity to membrane, the operation pressure condition, the salt concentration condition and the fouling (degree of becoming dirty) and is not always definite, it is preferred for a nanofiltration membrane to be about 10 to 90% in terms of NaCl-rejecting rate. Preferably, the water permeation property is as high as possible within such an extent that the resistance to pressure and the property stability of a separation membrane are ensured. The NaCl-rejecting rate is more preferred to be about 20 to 85%. Preferably, the water permeation property is as high as possible within such an extent that the resistance to pressure and the salt rejection stability of a separation membrane are ensured. The composite separation membrane of the present invention is very advantageous as a liquid treating membrane for nanofiltration in such a view that it satisfies the above-mentioned conditions of NaCl-rejection rate and water permeation property for a long period.

EXAMPLES

Example 1

(Preparation of Porous Support Membrane)

As a polymer for a porous support membrane, Polyphenylene Ether PX100L (hereinafter, abbreviated as PPE) manufactured by Mitsubishi Engineering Plastic KK was provided. N-Methyl-2-pyrrolidone (hereinafter, abbreviated as NMP) was added thereto so as to make PPE content 30% by mass. The resulting mixture was dissolved at 130° C. with kneading to give a homogeneous dope for membrane preparation.

After that, the dope for membrane preparation was kept at the temperature of 70° C., and extruded from a double cylindrical nozzle into a hollow shape. At the same time, a 70% aqueous solution of NMP was extruded as an inner liquid. The resulting one was made to run in air of ordinary room temperature for a drying treatment, and then immersed in a coagulation bath of 40° C. filled with a 35% aqueous solution of NMP. The resulting PPE porous support membrane was subjected to a washing treatment with water.

The PPE porous support membrane washed with water was impregnated with a 50% by mass aqueous solution of glycerol, and dried for one night at 50° C. to give a membrane subjected to a clogging treatment.

Outer diameter and membrane thickness of the resulting PPE porous support membrane were 260 μm and 45 μm, respectively. As a result of pure water permeability test, permeation flow rate FR of the pure water was 5000 L/m²/day under the test pressure of 0.5 MPa.

(Preparation of Composite Separation Membrane)

SPAE having a repeating structure of a hydrophobic segment represented by the above formula (I) and a hydrophilic segment represented by the above formula (II) was prepared as follows.

Firstly, 3,3'-disulfo-4,4'-dichlorodiphenylsulfone disodium salt (hereinafter, abbreviated as S-DCDPS), 2,6-dichlorobenzonitrile (hereinafter, abbreviated as DCBN), 4,4'-biphenol, potassium carbonate and molecular sieve were weighed and charged into a four-necked flask. Nitrogen was flown thereinto. NMP was added thereto. The resulting mixture was stirred at 150° C. for 50 minutes. After that, reaction temperature was raised up to 195° C.-200° C., and the reaction was continued taking a sufficient rise of viscosity of the system as a yardstick. After that, the system was allowed to cool. After that, the sedimented molecular sieve was removed and the remainder was precipitated into water. The resulting polymer was washed in boiling water for 1 hour, and carefully washed with pure water for completely removing the residual potassium carbonate. After that, the residual polymer free from potassium carbonate was dried to give the aimed SPAE having the degree of sulfonation (DS) of 44%. The sulfonic groups therein were almost neutralized with potassium.

A glass transition temperature $T_g$ of the SPAE polymer was evaluated and found to be $T_g$=322° C. Solubility of the resulting SPAE polymer in 2-methoxyethanol, formic acid and diethylene glycol as the solvents of the solvent group 2 was tested, but no sufficient solubility was achieved. The resulting SPAE polymer could be dissolved in any of NMP, DMAc, GBL, DMF and DMSO which are the solvent group 1.

A DMSO solvent was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by drying at 100° C. The composite separation membrane prepared by being fully dried was rolled around a winder.

The resulting composite separation membrane was immersed into a 50% aqueous solution of ethanol for 30 minutes to carry out a hydrophilizing treatment, and then subjected to a test for evaluating the property. Permeation flow rate was 510 L/m²/day and salt rejecting rate was 48.5% under the condition wherein the test pressure was 0.5 MPa and the sodium chloride concentration was 1500 mg/L.

As a result of an observation under an SEM, thickness of an SPAE separation layer in the resulting composite separation membrane was 160 nm. An SEM image of the cross section of the membrane, an enlarged SEM image of the outer layer part of the cross section of the membrane, and an enlarged SEM image of the membrane surface are shown in FIGS. 3 to 5, respectively.

Example 2

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 5000 L/m²/day under the test pressure of 0.5 MPa.

(Preparation of Composite Separation Membrane)

The same operation as in Example 1 was conducted except that the ratio of charging amounts of S-DCDPS and DCBN was changed whereupon SPAE having DS of 15% was prepared.

A glass transition temperature $T_g$ of the SPAE polymer was evaluated and found to be $T_g$=244° C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A composite separation membrane was prepared by the same method as in Example 1. The resulting composite separation membrane was subjected to a test for evaluating the property. Permeation flow rate was 40 L/m²/day and salt rejecting rate was 84.0% under the condition wherein the test pressure was 0.5 MPa and the sodium chloride concentration was 1500 ma/L.

As a result of an observation under an SEM, thickness of an SPAE separation layer in the resulting composite separation membrane was 100 nm.

Example 3

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 4900 L/m²/day under the test pressure of 0.5 MPa.

(Preparation of Composite Separation Membrane)

The same operation as in Example 1 was conducted except that the ratio of charging amounts of S-DCDPS and DCBN was changed whereupon SPAE having DS of 26.5% was prepared.

A glass transition temperature $T_g$ of the SPAE polymer was evaluated and found to be $T_g=319°$ C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A composite separation membrane was prepared by the same method as in Example 1. The resulting composite separation membrane was subjected to a test for evaluating the property. Permeation flow rate was 102 L/m²/day and salt rejecting rate was 81.3% under the condition wherein the test pressure was 0.5 MPa and the sodium chloride concentration was 1500 ma/L.

As a result of an observation under an SEM, thickness of an SPAE separation layer in the resulting composite separation membrane was 120 nm.

Example 4

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 4900 L/m²/day under the test pressure of 0.5 MPa.

(Preparation of Composite Separation Membrane)

The same operation as in Example 1 was conducted except that the ratio of charging amounts of S-DCDPS and DCBN was changed whereupon SPAE having DS of 65% was prepared.

A glass transition temperature $T_g$ of the SPAE polymer was evaluated and found to be $T_g=397°$ C. Solubility of the resulting SPAE polymer in 2-methoxyethanol, formic acid and diethylene glycol as the solvents of the solvent group 2 was tested, but no sufficient solubility was achieved. The resulting SPAS polymer could be dissolved in any of NMP, DMAc, GBL, DMF and DMSO which are the solvent group 1.

A composite separation membrane was prepared by the same method as in Example 1. The resulting composite separation membrane was subjected to a test for evaluating the property. Permeation flow rate was 1600 L/m²/day and salt rejecting rate was 20.2% under the condition wherein the test pressure was 0.5 MPa and the sodium chloride concentration was 1500 mg/L.

As a result of an observation under an SEM, thickness of an SPAE separation layer in the resulting composite separation membrane was 140 nm.

Example 5

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 5000 L/m²/day under the test pressure of 0.5 MPa.

(Preparation of Composite Separation Membrane)

SPAE having a repeating structure of a hydrophobic segment represented by the following formula (VI) and a hydrophilic segment represented by the following formula (VII) was prepared as follows. These formulae were selected among the combinations of the formulae (IV) and (V).

Firstly, 3,3'-disulfo-4,4'-dichlorodiphenylsulfone disodium salt (hereinafter, abbreviated as S-DCDPS), 4,4'-dichlorodiphenylsulfone (hereinafter, abbreviated as DCDPS), 4,4'-biphenol, potassium carbonate and molecular sieve were weighed and charged into a four-necked flask. Nitrogen was flown thereinto. NMP was added thereto. The resulting mixture was stirred at 150° C. for 50 minutes. After that, reaction temperature was raised up to 195° C.-200° C., and the reaction was continued taking a sufficient rise of viscosity of the system as a yardstick. After that, the system was allowed to cool. After that, the sedimented molecular sieve was removed and the remainder was precipitated into water. The resulting polymer was washed in boiling water for 1 hour, and carefully washed with pure water for completely removing the residual potassium carbonate. After that, the residual polymer free from potassium carbonate was dried to give the aimed SPAE having the degree of sulfonation (DS) of 20%. The sulfonic groups therein were almost neutralized with potassium.

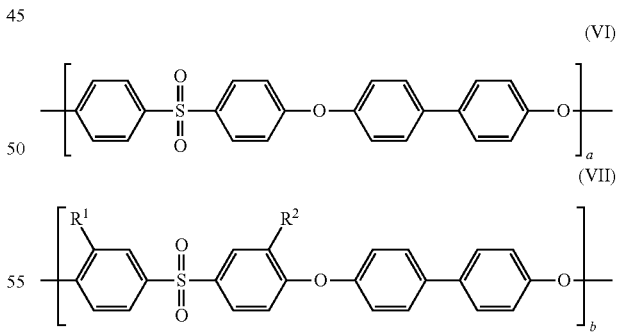

With regard to a and b as well as $R^1$ and $R^2$ in the above formulae, they have the same meanings as stipulated for the formulae (IV) and (V).

A glass transition temperature $T_g$ of the SPAE polymer was evaluated and found to be $T_g=265°$ C. As a solvent of the solvent group 2 for the SPAE polymer, no sufficient solubility therefor was noted in 2-methoxyethanol and formic acid. Although solubility in diethylene glycol was noted to some extent when stirring was conducted at about 130° C.

for one night, the solution was in a gel form at ordinary room temperature whereby no good coating could be conducted. The polymer showed good solubility in NMP, DMAc, GBL, DMF and DMSO which are the solvent group 1.

A composite separation membrane was prepared by the same preparation method of coating solution and coating method as in Example 1. The resulting composite separation membrane was subjected to a test for evaluating the property. Permeation flow rate was 44 L/m²/day and salt rejecting rate was 82.2% under the condition wherein the test pressure was 0.5 MPa and the sodium chloride concentration was 1500 mg/L.

As a result of an observation under an SEM, thickness of an SPAE separation layer in the resulting composite separation membrane was 120 nm.

Example 6

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 4900 L/m²/day under the test pressure of 0.5 MPa.

(Preparation of Composite Separation Membrane)

The same operation as in Example 1 was conducted whereupon SPAE having DS of 44% was prepared.

A glass transition temperature $T_g$ of the SPAE polymer was evaluated and found to be $T_g=322°$ C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A DMSO solvent was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by drying at 140° C. Frequency of fiber breakage of the porous support membrane was high at this temperature. Therefore, the drying treatment was conducted at 60° C. which was a well lower temperature than a dissolving temperature of PPE in DMAc. Since no fiber breakage happened in that case, the composite separation membrane prepared by being fully dried was rolled around a winder.

The resulting composite separation membrane was immersed into a 50% aqueous solution of ethanol for 30 minutes to carry out a hydrophilizing treatment and then subjected to a test for evaluating the property. Permeation flow rate was 720 L/m²/day and salt rejecting rate was 32.5% under the condition wherein the test pressure was 0.5 MPa and the sodium chloride concentration was 1500 mg/L.

As a result of an observation under an SEM, thickness of an SPAE separation layer in the resulting composite separation membrane was 160 nm.

Example 7

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 5000 L/m²/day under the test pressure of 0.5 MPa.

(Preparation of Composite Separation Membrane)

The same operation as in Example 1 was conducted whereupon SPAE having DS of 44% was prepared.

A glass transition temperature $T_g$ of the SPAE polymer was evaluated and found to be $T_g=322°$ C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

An NMP solvent was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by drying at 160° C. Frequency of fiber breakage of the porous support membrane was very high at this temperature, and thus it is impossible to stably prepare a sample for evaluation. Therefore, the drying treatment was conducted at 60° C. which was a well lower temperature than a dissolving temperature of PPE in NMP. Since no fiber breakage happened in that case, the composite separation membrane prepared by being fully dried was rolled around a winder.

The resulting composite separation membrane was immersed into a 50% aqueous solution of ethanol for 30 minutes to carryout a hydrophilizing treatment, and then subjected to a test for evaluating the property. Permeation flow rate was 780 L/m²/day and salt rejecting rate was 33.0% under the condition wherein the test pressure was 0.5 MPa and the sodium chloride concentration was 1500 mg/L.

As a result of an observation under an SEM, thickness of an SPAE separation layer in the resulting composite separation membrane was 190 nm.

Example 8

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 μm and 45 μm, respectively. Permeation flow rate FR of the pure water was 5000 L/m²/day under the test pressure of 0.5 MPa.

(Preparation of Composite Separation Membrane)

The same operation as in Example 1 was conducted whereupon SPAE having DS of 44% was prepared.

A glass transition temperature $T_g$ of the SPAE polymer was evaluated and found to be $T_g=322°$ C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A DMF solvent was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by drying at 140° C. Fiber breakage of the porous support membrane happened at this temperature. Therefore, the drying treatment was conducted at 60° C. which was a well lower temperature than a dissolving temperature of PPE in DMF. Since no fiber breakage happened in that case, the composite separation membrane prepared by being fully dried was rolled around a winder.

The resulting composite separation membrane was immersed into a 50% aqueous solution of ethanol for 30 minutes to carry out a hydrophilizing treatment, and then subjected to a test for evaluating the property. Permeation flow rate was 460 L/m$^2$/day and salt rejecting rate was 47.0% under the condition wherein the test pressure was 0.5 MPa and the sodium chloride concentration was 1500 mg/L.

As a result of an observation under an SEM, thickness of an SPAE separation layer in the resulting composite separation membrane was 170 nm.

Example 9

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 µm and 45 µm, respectively. Permeation flow rate FR of the pure water was 4900 L/m$^2$/day under the test pressure of 0.5 MPa.

(Preparation of Composite Separation Membrane)

The same operation as in Example 1 was conducted whereupon SPAE having DS of 44% was prepared.

A glass transition temperature $T_g$ of the SPAE polymer was evaluated and found to be $T_g$=322° C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A GBL solvent was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by fully drying at 120° C. The resulting composite separation membrane was rolled around a winder.

The resulting composite separation membrane was immersed into a 50% aqueous solution of ethanol for 30 minutes to carry out a hydrophilizing treatment, and then subjected to a test for evaluating the property. Permeation flow rate was 490 L/m$^2$/day and salt rejecting rate was 54.5% under the condition wherein the test pressure was 0.5 MPa and the sodium chloride concentration was 1500 mg/L.

As a result of an observation under an SEM, thickness of an SPAE separation layer in the resulting composite separation membrane was 120 nm.

Example 10

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 µm and 45 µm, respectively. Permeation flow rate FR of the pure water was 4900 L/m$^2$/day under the test pressure of 0.5 MPa.

(Preparation of Composite Separation Membrane)

The same operation as in Example 1 was conducted whereupon SPAE having DS of 44% was prepared.

A glass transition temperature $T_g$ of the SPAE polymer was evaluated and found to be $T_g$=322° C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A mixed solvent of NMP and DMSO in weight ratio of 50:50 was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by fully drying at 100° C. The resulting composite separation membrane was rolled around a winder.

The resulting composite separation membrane was immersed into a 50% aqueous solution of ethanol for 30 minutes to carry out a hydrophilizing treatment, and then subjected to a test for evaluating the property. Permeation flow rate was 445 L/m$^2$/day and salt rejecting rate was 58.2% under the condition wherein the test pressure was 0.5 MPa and the sodium chloride concentration was 1500 mg/L.

As a result of an observation under an SEM, thickness of an SPAE separation layer in the resulting composite separation membrane was 100 nm.

Example 11

(Preparation of Porous Support Membrane)

As a polymer for a porous support membrane, a PPE porous support membrane was prepared by the same method as in Example 1 and subjected to a clogging treatment. Outer diameter and membrane thickness of the hollow fiber membrane were 260 µm and 45 µm, respectively. Permeation flow rate FR of the pure water was 5200 L/m$^2$/day under the test pressure of 0.5 MPa.

(Preparation of Composite Separation Membrane)

The same operation as in Example 1 was conducted whereupon SPAE having DS of 44% was prepared.

A glass transition temperature $T_g$ of the SPAE polymer was evaluated and found to be $T_g$=322° C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A mixed solvent of NMP and diethylene glycol in weight ratio of 50:50 was added to the resulting SPAE. The resulting mixture was stirred at ordinary room temperature and dissolved to give a coating solution of 3% by mass concentration.

The SPAE coating solution was filled in a bath equipped with free rollers. The PPE porous support membrane was passed therethrough, pulled up at the rate of 1 m/minute and passed through a drying furnace of a vertical type being compulsorily convected, followed by fully drying at 100° C. The resulting composite separation membrane was rolled around a winder.

The resulting composite separation membrane was immersed into a 50% aqueous solution of ethanol for 30 minutes to carry out a hydrophilizing treatment, and then subjected to a test for evaluating the property. Permeation flow rate was 382 L/m²/day and salt rejecting rate was 54.2% under the condition wherein the test pressure was 0.5 MPa and the sodium chloride concentration was 1500 mg/L.

As a result of an observation under an SEM, thickness of an SPAE separation layer in the resulting composite separation membrane was 220 nm.

Example 12

(Preparation of Porous Support Membrane)

As a polymer for a porous support membrane, Polyphenylene Ether PX100L (hereinafter, abbreviated as PPE) manufactured by Mitsubishi Engineering Plastic KK was provided as in Example 1. N-Methyl-2-pyrrolidone (hereinafter, abbreviated as NMP) was added thereto so as to make PPE content 18% by mass. The resulting mixture was dissolved at 130° C. with kneading to give a homogeneous dope for membrane preparation.

After that, paper which was made from polyester (05TH-60 manufactured by Hirose Seishi) appropriately impregnated with a 50% aqueous solution of glycerol was placed on a glass substrate kept at 70° C. and a dope for membrane preparation of 70° C. was uniformly coated thereon using a hand coater. After a drying treatment for about 10 seconds, it was immersed into a 35% aqueous solution of NMP at 30° C. to give a porous support membrane in a flat shape. After that, a treatment of washing with water was conducted. Thickness of the PPE porous support membrane except the paper made from polyester in the resulting membrane was 40 μm.

The PPE porous support membrane washed with water was impregnated with a 50% by mass aqueous solution of glycerol, and dried for one night at 50° C. to give a membrane subjected to a clogging treatment.

(Preparation of Composite Separation Membrane)

The same operation as in Example 2 was conducted whereupon SPAE having DS of 15% was prepared.

A glass transition temperature $T_g$ of the SPAE polymer was evaluated and found to be $T_g=244°$ C. Solubility of the resulting SPAE polymer in 2-methoxyethanol, formic acid and diethylene glycol as the solvents of the solvent group 2 was tested, but no solubility was achieved. The resulting SPAE polymer could be dissolved in any of NMP, DMAc, GBL, DMF and DMSO which are the solvent group 1.

A DMSO solvent was added to the resulting SPAE. The resulting mixture was stirred at ordinary room temperature and dissolved to give a coating solution of 0.7% by mass concentration and a coating solution of 0.1% by mass concentration.

A process of making into a composite membrane was conducted by means of a brush coating onto the surface of a PPE porous support membrane in a flat shape of 30 cm square. Since it was noted that defect due to uneven coating was apt to happen by means of a brush coating, the above coating solution of 0.7% by mass was carefully applied and drying was conducted at 80° C. for 30 minutes with mild hot air. After that, a coating solution of 0.1% by mass was applied one again thereon using a brush and re-dried at 80° C. for 30 minutes whereupon a reduction in the defect was possible.

The resulting composite separation membrane was immersed into a 50% aqueous solution of ethanol for 30 minutes to carry out a hydrophilizing treatment, and then subjected to a test for evaluating the property. The same operation as in other Examples was conducted using the evaluating conditions wherein the test pressure was 0.5 MPa and the sodium chloride concentration was 1500 mg/L except that an evaluating apparatus for flat membrane was used whereupon permeation flow rate was 43 L/m²/day and salt rejecting rate was 84.0%.

As a result of an observation under an SEM, thickness of an SPAE separation layer in the resulting composite separation membrane was 350 nm.

Comparative Example 1

(Preparation of Porous Support Membrane)

Polyether Sulfone 5200P (hereinafter, abbreviated as PES) manufactured by Sumitomo Chemical Co., Ltd. as a polymer for a porous support membrane, and Polyvinylpyrrolidone K85 (hereinafter, abbreviated as PVP) manufactured by BASF SE as a hydrophilic polymer were provided. NMP was added thereto so as to make PES content 30% by mass and PVP content 2% by mass. The resulting mixture was dissolved at 120° C. with kneading to give a homogeneous dope for membrane preparation.

After that, the dope for membrane preparation was kept at the temperature of 60° C., and extruded from a double cylindrical nozzle into a shape of hollow fiber membrane. At the same time, a 70% aqueous solution of NMP was extruded as an inner liquid to mold. The resulting one was made to run in air of ordinary room temperature for a drying treatment, and then immersed in a coagulation bath of 40° C. filled with a 35% aqueous solution of NMP. The resulting PES porous support membrane was subjected to a washing treatment with water.

The PES porous support membrane washed with water was impregnated with a 50% by mass aqueous solution of glycerol, and dried for one night at 50° C. to give a membrane subjected to a clogging treatment.

Outer diameter and membrane thickness of the resulting PES porous support membrane were 255 μm and 40 μm, respectively. As a result of pure water permeability test, permeation flow rate FR of the pure water was 3800 L/m²/day under the test pressure of 0.5 MPa.

(Preparation of Composite Separation Membrane)

The PES porous support membrane was passed through a bath filled with the SPAE coating solution in a DMSO solvent prepared by the same method as in Example 1 whereupon the membrane significantly swelled and then dissolved resulting in fiber breakage. Accordingly, composite separation membrane could not be obtained.

Comparative Example 2

(Preparation of Porous Support Membrane)

Polyvinylidene Fluoride kynar301F (hereinafter, abbreviated as PVDF) manufactured by Arkema S.A. as a polymer for a porous support membrane, and Polyvinylpyrrolidone K85 (hereinafter, abbreviated as PVP) manufactured by BASF SE as a hydrophilic polymer were provided. NMP was added thereto so as to make PVDF content 28% by mass and PVP content 2% by mass. The resulting mixture was dissolved at 140° C. with kneading to give a homogeneous dope for membrane preparation.

After that, the dope for membrane preparation was kept at the temperature of 50° C., and extruded from a double cylindrical nozzle into a shape of hollow fiber membrane. At the same time, a 70% aqueous solution of NMP was extruded as an inner liquid to mold. The resulting one was made to run in air of ordinary room temperature for a drying treatment, and then immersed in a coagulation bath of 40° C. filled with a 35% aqueous solution of NMP. The resulting PVDF porous support membrane was subjected to a washing treatment with water.

The PVDF porous support membrane washed with water was impregnated with a 50% by mass aqueous solution of glycerol, and dried for one night at 50° C. to give a membrane subjected to a clogging treatment.

Outer diameter and membrane thickness of the resulting PVDF porous support membrane were 260 µm and 50 µm, respectively. As a result of pure water permeability test, permeation flow rate FR of the pure water was 2400 L/m²/day under the test pressure of 0.5 MPa.

(Preparation of Composite Separation Membrane)

The PVDF porous support membrane was passed through bath filled with the SPAE coating solution in a DMSO solvent prepared by the same method as in Example 1 whereupon, the same as in the case of the PES membrane of Comparative Example 1, the membrane swelled and the fiber dissolved in a drying furnace of 80° C. resulting in fiber breakage. Accordingly, composite separation membrane could not be obtained.

Comparative Example 3

(Preparation of a Coating Solution)

To an SPAE having sulfonation degree DS of 26.5% prepared by the same method as in Example 3 was added each of 2-methoxyethanol, formic acid and diethylene glycol from the solvent group 2 so as to make the SPAE content 3% by mass followed by stirring at 100° C. However, dissolved state was not resulted, and composite separation membrane could not be obtained.

<Evaluation of SPAE Polymers>

Sulfonation degree, ion exchange capacity (IEC) and glass transition temperature of SPAE polymers were evaluated as follows.

(IEC)

Weight of an SPAE polymer dried for one night under a nitrogen atmosphere was measured. Then the polymer was subjected to a stirring treatment with an aqueous solution of sodium hydroxide and to a back titration using an aqueous solution of hydrochloric acid to evaluate the ion exchange capacity (IEC).

(Sulfonation Degree)

A polymer (20 mg) dried at 100° C. in a vacuum drier for one night was dissolved in deuterized DMSO (DMSO-d6) manufactured by Nakarai Tesque and subjected to a proton NMR using Bruker Avance 500 (frequency: 500.13 MHz; temperature: 30° C.; FT integration: 32 times). In the resulting spectral chart, relation between proton contained in each of hydrophobic segment and hydrophilic segment and peak positions was identified and the sulfonation degree was determined from the ratio of integral strength per proton of the independent peak in the hydrophobic segment and the independent peak in the hydrophilic segment.

(Glass Transition Temperature)

Glass transition temperature of the SPAE polymer powder in a dry state was evaluated by means of a differential scanning calorimetry (DSC). Specifically, a polymer sample was filled in a sample pan made of aluminum and measured using a Q100 manufactured by TA Instrument. As the first scan, temperature was raised to such an extent that the SPAE was not thermally degraded followed by cooling and, in the second scan wherein the temperature was raised again, glass transition temperature was evaluated. Since the data for water contained in the polymer were contaminated in the first scan, the second scan was adopted for excluding the influence of water on the data. To be more specific, temperature was raised from 20° C. up to 320° C. at 20° C./min and lowered down to 20° C. at 20° C./min. After that, as the second scan, the temperature was raised again from 20° C. up to 450° C. at 20° C./min. With regard to the glass transition temperature, central point of the changing steps for heat capacity was evaluated using Universal Analysis 2000 manufactured by TA Instrument. However, since thermostability of the polymer may vary depending upon the chemical structure of SPAE, the reaching temperature in the first scan is to be limited, if necessary, to such an extent that the polymer is not significantly deteriorated. Thus, decomposing temperature of the polymer is checked in advance by means of thermogravimetric analysis (TGA) and the abovementioned reaching temperature of the first scan is adjusted. As a rough yardstick, it is made lower than the temperature wherein 5% reduction in weight of the polymer takes place in an atmosphere of inert gas.

<Method for Evaluation of Composite Separation Membrane>

Composite separation membranes of Examples 1 to 12 prepared as above were subjected to evaluation of membrane shape, evaluation of separation layer thickness and evaluations of separation property and permeation property according to the following methods.

(Shape of Porous Support Membrane)

Evaluation of the shape of porous support membrane samples (hollow fiber) of Examples 1 to 11 was conducted by the following method. Thus, an SUS plate of 2 mm thickness wherein pores of 3 mm diameter were formed was provided. Then, an appropriate amount of hollow fiber bundles was filled in the pores and cut using a blazer to expose the cross section of the hollow fiber bundles, then a picture of the shape of the cross section was taken using a microscope (ECLIPSE LV100) manufactured by Nikon, an image processing apparatus (DIGITAL SIGHT DS-U2) and a CCD camera (DS-Ri1) made by Nikon. Then outer and inner diameters of the cross section of the hollow fiber were measured by means of a measuring function of the analysis software (NIS Element D3.00 SP6) whereupon the outer and inner diameters and thickness of the hollow fiber membrane were calculated. Evaluation of shape of the porous support membrane sample (flat membrane) of Example 12 was conducted in such a manner that a sample in a state of containing water was frozen with liquid nitrogen, cut/broken and dried with air. Pt was subjected to sputtering to the resulting cut/broken area. Observation was conducted under a scanning electron microscope S-4800 manufactured by Hitachi with an accelerated voltage of 5 kV whereupon the thickness of the porous support membrane excluding the area of nonwoven fabric of polyester was measured.

(Thickness of Composite Separation Membrane Sample)

Composite separation membranes of Examples 1 to 12 were subjected to a hydrophilizing treatment using a 50% aqueous solution of ethanol, immersed into water, frozen, cut/broken and dried with air. Pt was subjected to sputtering to the resulting cut/broken area. Observation was conducted under a scanning electron microscope S-4800 manufactured by Hitachi with an accelerated voltage of 5 kV. FIG. 1 shows a picture of the composite separation membrane of Example 1 under an SEM as an example of the SEM pictures. Thickness of the separation layer was measured by taking the picture of the outer layer part of the membrane.

(Separation Property and Permeation Property of Composite Separation Membrane)

After the hollow fiber membranes of any of Examples 1-11 were bundled and inserted into a sleeve made of plastic, thermosetting resin was injected into the sleeve and hardened to seal. Terminal of the hollow fiber membrane hardened by the thermosetting resin was cut to give an opening of the hollow fiber membrane whereupon there was prepared a module for the evaluation. This module for the evaluation was connected to a device for testing properties of hollow fiber membrane comprising a tank for feed water and a pump, and the properties were evaluated. The flat membrane of Example 12 was set on a device for evaluating properties of flat membrane comprising a tank for feed water and a pump similar to the above device, and the properties were evaluated. As an evaluation condition, a feed aqueous solution having sodium chloride concentration of 1500 mg/L was operated at 25° C., 0.5 MPa pressure and for about 30 minutes to 1 hour (s). After that, water permeated through the membrane was collected and weight of permeated water was measured by an electron balance (LIBROR EB-3200D manufactured by Shimadzu). The weight of permeated water was converted to amount of permeated water at 25° C. according to the following formula:

amount of permeated water(L)=weight of permeated water(kg)/0.99704(kg/L)

Permeation flow rate (FR) is calculated by the following formula:

$FR[L/m^2/day]$=amount of the permeated water(L)/ membrane area$[m^2]$/collecting time[minutes]× (60[minutes]×24[hours])

Sodium chloride concentration was measured using a conductometric detector (CM-25R by Toa DKK) from the permeated water collected in the above measurement for permeation flow rate and the feed aqueous solution having sodium chloride concentration of 1,500 mg/L used for the same measurement of permeation flow rate.

Salt rejection rate is calculated by the following formula:

salt rejection rate[%]=(1−salt concentration of permeated water[mg/L]/salt concentration of feed aqueous solution[mg/L])×100

TABLE 2

| | Porous support membrane | Membrane shape | SPAE chemical structure | Membrane thickness (1) support membrane (2) separation layer µm | Outer diameter of membrane | Coating solvent | Degree of sulfonation DS % | Ion exchange capacity IEC meq/g | Glass transition temperature Tg ° C. | Water permeation property Condition: 0.5 MPa, 1500 ppm L/m²/day | NaCl rejecting rate % |
|---|---|---|---|---|---|---|---|---|---|---|---|
| Example 1 | PPE | hollow fiber membrane | formula (I)(II) | (1) 45 µm (2) 160 nm | 260 | DMSO | 44 | 2.17 | 322 | 510 | 48.5 |
| Example 2 | PPE | hollow fiber membrane | formula (I)(II) | (1) 45 µm (2) 100 nm | 260 | DMSO | 15 | 0.92 | 244 | 40 | 84.0 |
| Example 3 | PPE | hollow fiber membrane | formula (I)(II) | (1) 45 µm (2) 120 nm | 260 | DMSO | 26.5 | 1.48 | 319 | 102 | 81.3 |
| Example 4 | PPE | hollow fiber membrane | formula (I)(II) | (1) 45 µm (2) 140 nm | 260 | DMSO | 65 | 2.8 | 397 | 1600 | 20.2 |
| Example 5 | PPE | hollow fiber membrane | formula (VI)(VII) | (1) 45 µm (2) 120 nm | 260 | DMSO | 20 | 0.92 | 265 | 44 | 82.2 |
| Example 6 | PPE | hollow fiber membrane | formula (I)(II) | (1) 45 µm (2) 160 nm | 260 | DMAc | 44 | 2.17 | 322 | 720 | 32.5 |
| Example 7 | PPE | hollow fiber membrane | formula (I)(II) | (1) 45 µm (2) 190 nm | 260 | NMP | 44 | 2.17 | 322 | 780 | 33 |
| Example 8 | PPE | hollow fiber membrane | formula (I)(II) | (1) 45 µm (2) 170 nm | 260 | DMF | 44 | 2.17 | 322 | 460 | 47 |
| Example 9 | PPE | hollow fiber membrane | formula (I)(II) | (1) 45 µm (2) 120 nm | 260 | GBL | 44 | 2.17 | 322 | 490 | 54.5 |
| Example 10 | PPE | hollow fiber membrane | formula (I)(II) | (1) 45 µm (2) 100 nm | 260 | NMP/DMSO (weight ratio 50:50) | 44 | 2.17 | 322 | 445 | 58.2 |
| Example 11 | PPE | hollow fiber membrane | formula (I)(II) | (1) 45 µm (2) 220 nm | 260 | DMSO/ diethylene glycol (weight ratio 50:50) | 44 | 2.17 | 322 | 382 | 54.2 |

TABLE 2-continued

| | Porous support membrane | Membrane shape | SPAE chemical structure | Membrane thickness (1) support membrane (2) separation layer μm | Outer diameter of membrane μm | Coating solvent | Degree of sulfonation DS % | Ion exchange capacity IEC meq/g | Glass transition temperature Tg ° C. | Water permeation property Condition: 0.5 MPa, 1500 ppm L/m²/day | NaCl rejecting rate % |
|---|---|---|---|---|---|---|---|---|---|---|---|
| Example 12 | PPE | flat membrane | formula (I)(II) | (1) 40 μm (2) 350 nm | none | DMSO | 15 | 0.92 | 244 | 43 | 84.0 |
| Comparative Example 1 | PES | hollow fiber membrane | formula (I)(II) | — | — | DMSO | 44 | 1.48 | 322 | Membrane could not be manufactured. (Support membrane dissolved.) | |
| Comparative Example 2 | PVDF | hollow fiber membrane | formula (I)(II) | — | — | DMSO | 44 | 1.48 | 322 | Membrane could not be manufactured. (Support membrane dissolved.) | |
| Comparative Example 3 | — | — | formula (I)(II) | — | — | 2-methoxyethanol formic acid diethylene glycol | 26.5 | 1.48 | 319 | Membrane could not be manufactured. (SPAE could not be dissolved.) | |

INDUSTRIAL APPLICABILITY

The composite separation membrane of the present invention can keep its salt rejecting property and water permeation property in high levels in spite of the use of a material excellent in resistance to chemicals. Accordingly, it is very useful in a nanofiltration treatment and in a reverse osmosis treatment.

EXPLANATION OF REFERENCE NUMBER

1: Separation layer formed of SPAE
2: Porous support membrane formed of PPE
3: Nonwoven fabric

The invention claimed is:

1. A composite separation membrane for separating ion and solute from liquid, and being prepared by applying, on the surface of a porous support membrane having a thickness of 5 μm to 500 μm, a separation layer of thin film having thickness of 5 nm to 1 μm, characterized in that said porous support membrane contains 50% by mass or more of polyphenylene ether, that said separation layer is formed of a sulfonated polyarylene ether copolymer constituted from a repeating structure of a hydrophobic segment and a hydrophilic segment, and that said sulfonated polyarylene ether copolymer is selected from members which are soluble in solvent group 1 while which are not soluble in solvent group 2, and which have a glass transition temperature of 200° C. or more in dry state,
   wherein prior to the applying step, the porous support membrane is subjected to a clogging treatment, wherein the sulfonated polyarylene ether copolymer is prevented from permeating into pores of the porous support membrane;
   wherein the solvent group 1 is selected from the group consisting of N-methyl-2-pyrrolidone, N,N-dimethylacetamide, dimethyl sulfoxide, N,N-dimethylformamide, and γ-butyrolactone, and
   wherein the solvent group 2 is selected from the group consisting of lower carboxylic acid including formic acid, alcohol, alkylene diol or triol and alkylene glycol alkyl ether.

2. The composite separation membrane according to claim 1, wherein said sulfonated polyarylene ether copolymer is constituted from a repeating structure of a hydrophobic segment represented by the following formula (IV) and a hydrophilic segment represented by the following formula (V):

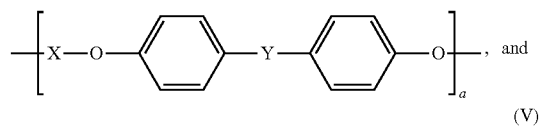

(IV)

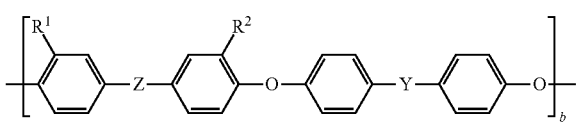

(V)

wherein

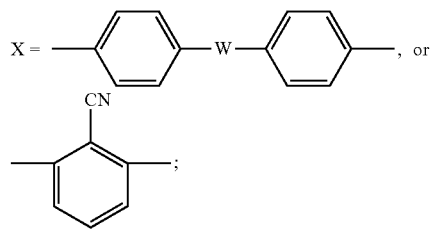

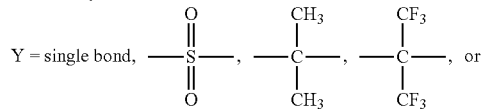

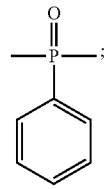

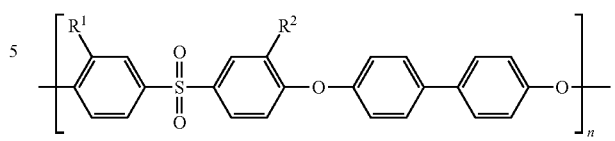

Y and W are not selected as the same thing;
a and b each represents a natural number of 1 or more;
R¹ and R² each represents —SO₃M or —SO₃H, wherein M represents a metal element; and
a sulfonation rate in terms of a percent rate of repeating number of the formula (V) in the sulfonated polyarylene ether copolymer to total of repeating number of the formula (IV) and repeating number of the formula (V) in the sulfonated polyarylene ether copolymer is more than 5% and less than 80%.

3. The composite separation membrane according to claim 1, wherein said sulfonated polyarylene ether copolymer is constituted from a repeating structure of a hydrophobic segment represented by the following formula (I) and a hydrophilic segment represented by the following formula (II):

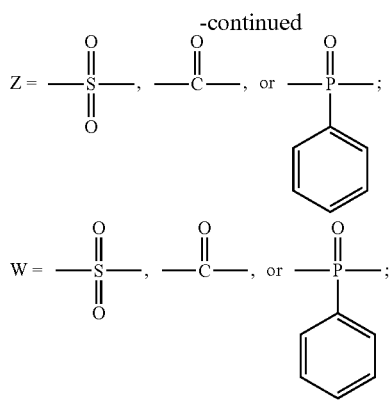

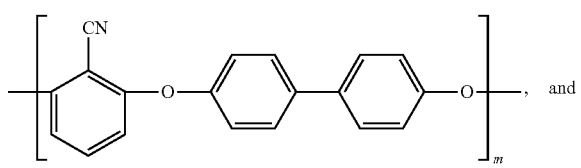

wherein m and n each represents a natural number of 1 or more;
R¹ and R² each represents —SO₃M or —SO₃H, wherein M represents a metal element; and
a sulfonation rate in terms of a percent rate of repeating number of the formula (II) in the sulfonated polyarylene ether copolymer to total of repeating number of the formula (I) and repeating number of the formula (II) in the sulfonated polyarylene ether copolymer is more than 5% and less than 80%.

4. The composite separation membrane according to claim 1, wherein content of the polyphenylene ether in the porous support membrane is 80% by mass or more.

5. A method for manufacturing the composite separation membrane mentioned in claim 1, characterized in that, a coating solution is applied on the surface of a porous support membrane containing 50% by mass or more polyphenylene ether, wherein said coating solution has been prepared by dissolving a sulfonated polyarylene ether copolymer in an aprotic polar solvent containing at least one member selected from the group consisting of dimethyl sulfoxide, N,N-dimethylacetamide, N,N-dimethylformamide, N-methyl-2-pyrrolidone and γ-butyrolactone; and then the coated surface is subjected to a drying treatment within such a temperature range that said solvent does not dissolve the polyphenylene ether porous support membrane.

* * * * *